No. 630,833. Patented Aug. 8, 1899.
E. A. JOHNSTON.
DEVICE FOR TIGHTENING ENDLESS CHAINS OR BELTS.
(Application filed Feb. 13, 1899.)
(No Model.)
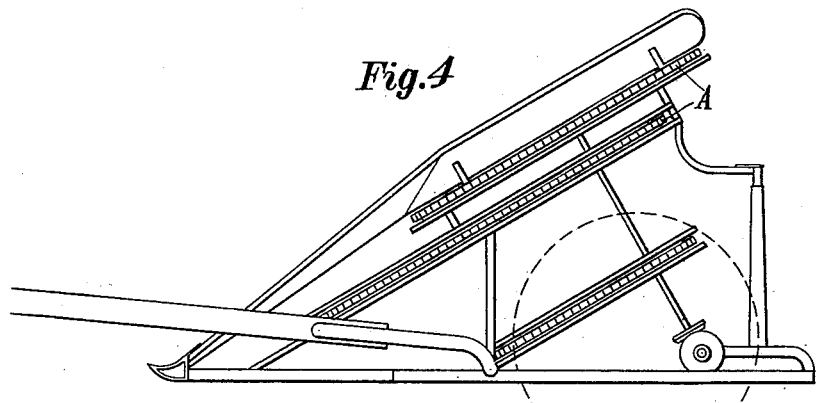
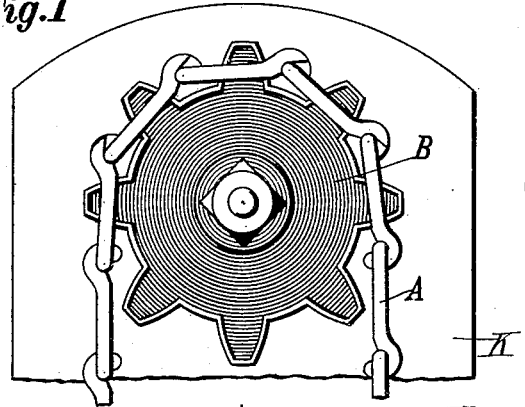
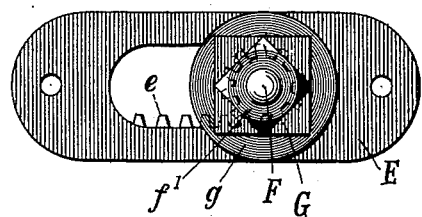
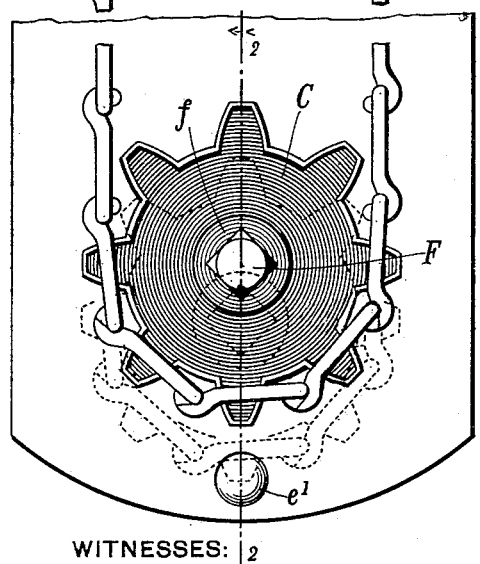
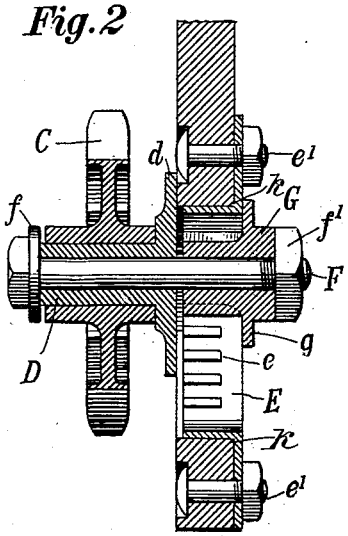
WITNESSES:
Lewis H. Williams
John M. Culver
INVENTOR
Edward A. Johnston
BY R. B. Swift
ATTORNEY.
THE NORRIS PETERS CO., PHOTO-LITHO., WASHINGTON, D. C.

UNITED STATES PATENT OFFICE.

EDWARD A. JOHNSTON, OF CHICAGO, ILLINOIS.

DEVICE FOR TIGHTENING ENDLESS CHAINS OR BELTS.

SPECIFICATION forming part of Letters Patent No. 630,833, dated August 8, 1899.

Application filed February 13, 1899. Serial No. 705,456. (No model.)

*To all whom it may concern:*

Be it known that I, EDWARD A. JOHNSTON, a citizen of the United States, residing at Chicago, county of Cook, and State of Illinois, have invented a new and useful Improvement in Devices for Tightening Endless Chains or Belts, of which the following is a specification.

My invention relates to improvements in chain and belt tighteners, and is more particularly applicable to those places where the chain or belt is driven from a fixed shaft at one end and at the other is supported on an idle sprocket or pulley which can be moved away from the fixed one, as in machines for harvesting corn, where the chains are long, and any intermediate tightener which takes up the slack by throwing a bend into the chain consumes the power of the machine, which is limited, and where the path of travel of the chain cannot be widened, because of interference with the stalks of corn; and the object of my improvement is, first, to form a tightener that can readily be adjusted by means of the ordinary tools carried with the machine, and, second, to form a simple practical device that does not occupy any added space upon the machine. I attain these objects by the mechanism illustrated in the accompanying drawings, in which—

Figure 1 is a plan view of the chain mounted on a pair of sprocket-wheels, one of which is adjustable by means of my improvement. Fig. 2 is a section on line 2 2 of Fig. 1, showing the adjustable sprocket. Fig. 3 is a bottom view of the track and pinion by which the adjustment is made; and Fig. 4 is a side view of a corn-harvesting machine of the Peck type, in which the corn is carried through the machine by toothed chains and for which machine my improvement is particularly adapted.

Similar letters refer to similar parts throughout the several views.

In the drawings, A represents a chain which is mounted on the driving-sprocket B and passes around the idle sprocket C. This idle sprocket C is mounted on a stud D, which has a wide base or flange $d$ to give the stud a solid foundation and to prevent its drawing into the framing K, which supports it. A slot, as indicated between $k\,k$, Fig. 2, is cut into the framing and fitted with the elongated bushing E. This bushing has a series of toothed projections $e$ on one of its elongated faces or flanges in the slot, as clearly illustrated in Figs. 2 and 3. This bushing is fastened to the framing K of the machine by the bolts $e'$. Over this elongated slot the stud D is positioned, its flange $d$ being wide enough to cover the slot and project upon the framing. A strong bolt F passes through the stud, and a washer $f$, projecting over the hub of the idle sprocket C, holds the sprocket upon the stud. On the other end of the bolt F the spur-pinion G is placed. The teeth of this pinion mesh with the teeth $e$ of the bushing E. The pinion G has a flange $g$, that projects over the edges of the framing that supports the bushing E. The hub of the pinion G from the flange $g$ is shorter than the teeth of the bushing E, and the flange prevents the pinion G from being drawn into the slot when the nut $f'$ of the bolt F is turned up. The outer end or head of the pinion G is squared and preferably of a size so that the nut $f'$ and pinion G may be turned by a single wrench.

The operation of the device is as follows: With the wrench, which is usually carried on the machine, the nut $f'$ is placed at such a degree of tightness on the bolt F as will give the flange $d$ of the stud D and the flange $g$ of the pinion G considerable friction upon the frame of the machine. The pinion G is then turned, its cogs meshing with the teeth on the bushing, thus carrying the stud and sprocket with it, the parts being bound together by the bolt F, and the chain or belt is thus tightened. When it has been drawn tight enough, the friction thrown upon the flanges of the stud and pinion will hold the parts, when by the wrench the nut $f'$ can be still further turned up and the sprocket securely held in place by the friction of the wide flanges of the stud and spur-pinion.

Having now described my invention, what I desire to secure by Letters Patent is—

1. The combination, to form a tightener for endless belts, chains and the like, of a slotted support having teeth on one of its interior walls, a bolt passed through said slot, a pinion mounted to turn freely on said bolt and having teeth in engagement with those on the support, and means for clamping said pinion to prevent rotation thereof.

2. The combination, to form a tightener for endless belts, chains and the like, of a slotted support having teeth on one of its interior walls, a bolt passed through said slot and carrying at one end a stud, a wheel mounted to turn on the said stud, a pinion mounted on the bolt to freely turn thereon and having its teeth in engagement with those of the said wall, and means for holding the pinion from rotation on the bolt.

3. The combination, to form a tightener for endless belts, chains and the like, of a slotted support having teeth on one of its interior walls, a bolt passed through said slot and carrying at one end a flanged stud, a wheel on said stud, a flanged pinion loosely mounted on the bolt and having its teeth in engagement with those on the said wall, and means for clamping the stud and pinion to prevent rotation of the latter.

4. In an endless belt or chain tightener, the combination of a frame, an elongated bushing secured thereto and having teeth thereon, a bolt passing through said bushing to extend on opposite sides thereof, a flanged stud carried thereby, a wheel on said stud, a flanged pinion mounted loosely on said bolt and having a projecting head, and means to clamp the stud and pinion in place and prevent rotation of said pinion on the bolt.

5. The combination, to form a tightener for endless belts, chains and the like, of a slotted support provided with teeth, a bolt passing through said slotted support and carrying a wheel, a pinion loosely mounted on said bolt and engaging the said teeth, and means to hold and release the pinion on the bolt.

6. The combination, to form a tightener for endless belts, chains and the like, of a supporting-frame on which the tightener is mounted having an elongated slot, a stud having a flange which projects over the sides of the slot, a series of teeth in the slot, a spur-pinion having teeth that engage with the teeth in the slot, a flange on the pinion, the hub of the pinion being shorter than the depth of the slot, a bolt fitted with a nut and passing through the stud and pinion, and means for enabling the pinion to be turned, whereby the chain is tightened and the nut on the bolt drawn up, pressing the flange of the spur-pinion and stud against the part that supports them.

EDWARD A. JOHNSTON.

Witnesses:
J. W. JOHNSON,
M. C. ROUAYNE.